(12) United States Patent
Ishishita

(10) Patent No.: US 10,074,878 B2
(45) Date of Patent: Sep. 11, 2018

(54) POWER STORAGE SYSTEM AND METHOD FOR CONTROLLING THE SAME

(71) Applicant: TOYOTA JIDOSHA KABUSHIKI KAISHA, Toyota-shi, Aichi-ken (JP)

(72) Inventor: Teruo Ishishita, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/524,666

(22) PCT Filed: Sep. 29, 2015

(86) PCT No.: PCT/JP2015/004937
§ 371 (c)(1),
(2) Date: May 5, 2017

(87) PCT Pub. No.: WO2016/088288
PCT Pub. Date: Jun. 9, 2017

(65) Prior Publication Data
US 2017/0324118 A1 Nov. 9, 2017

(30) Foreign Application Priority Data
Dec. 1, 2014 (JP) .................. 2014-243112

(51) Int. Cl.
*H02J 7/00* (2006.01)
*H01M 10/44* (2006.01)
*H01M 10/48* (2006.01)
*B60L 11/18* (2006.01)
*H01M 10/42* (2006.01)

(52) U.S. Cl.
CPC ....... *H01M 10/443* (2013.01); *B60L 11/1851* (2013.01); *H01M 10/486* (2013.01); *B60L 2240/36* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

2008/0042618 A1* 2/2008 Cromer ............... H01M 2/1066
320/134

FOREIGN PATENT DOCUMENTS

| CN | 103682519 A | * 3/2014 |
| JP | 2010-252427 A | 11/2010 |
| JP | 2013-5663 A | 1/2013 |

* cited by examiner

*Primary Examiner* — David V Henze-Gongola
(74) *Attorney, Agent, or Firm* — Sughrue Mion, PLLC

(57) ABSTRACT

Power storage system includes battery containing an electrolytic solution, and ECU that controls permission and prohibition of charge/discharge of battery based on inside temperature of battery. ECU sets determination temperature equal to or higher than freezing point of the electrolytic solution and determination temperature higher than determination temperature. ECU prohibits charge/discharge of battery when inside temperature falls below determination temperature while the electrolytic solution is in a liquid state, and cancels the prohibition of charge/discharge of battery when the electrolytic solution turns into the liquid state from a state in which the electrolytic solution is at least partially solidified, and when the temperature of battery exceeds determination temperature.

7 Claims, 10 Drawing Sheets

FIG.4
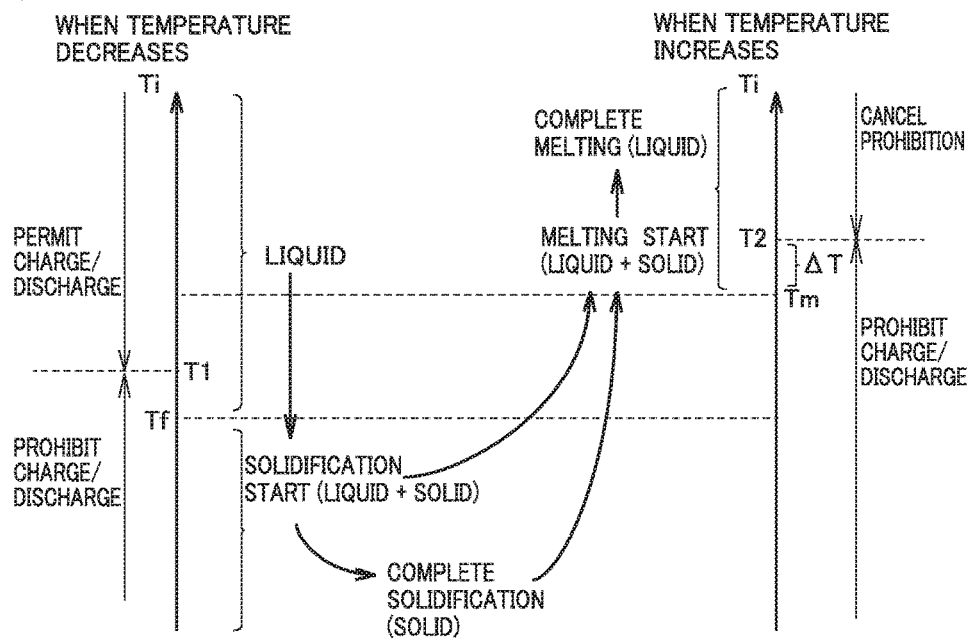
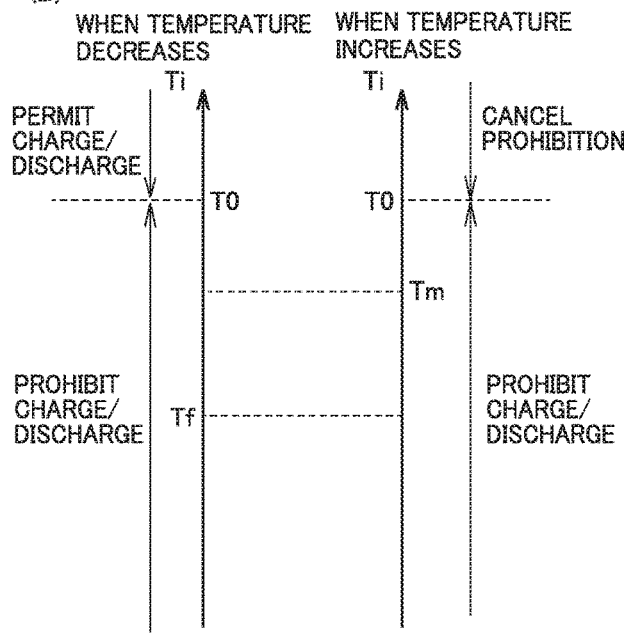

FIG.5
(A)
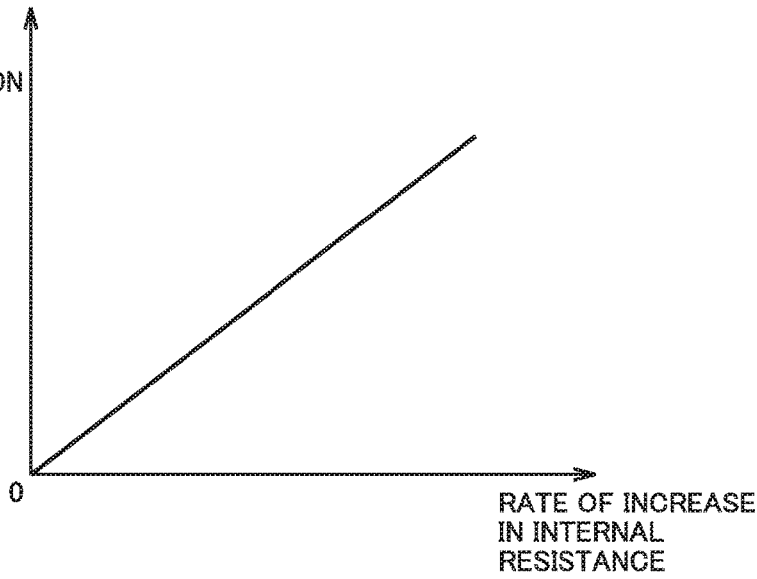
(B)
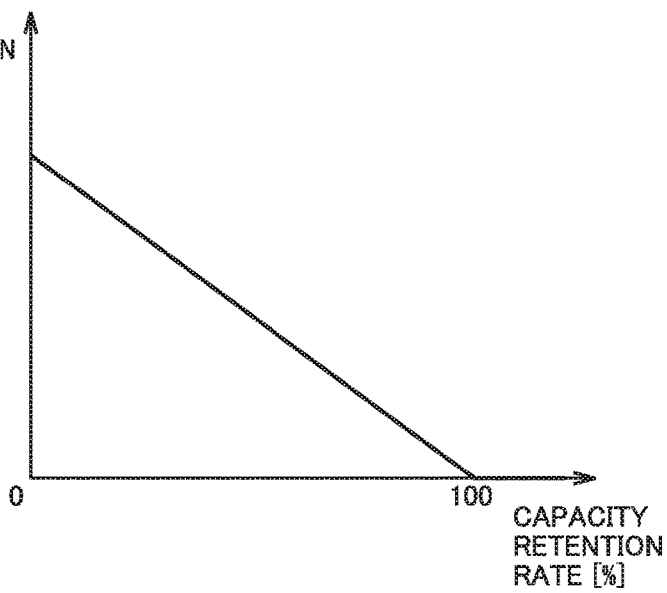

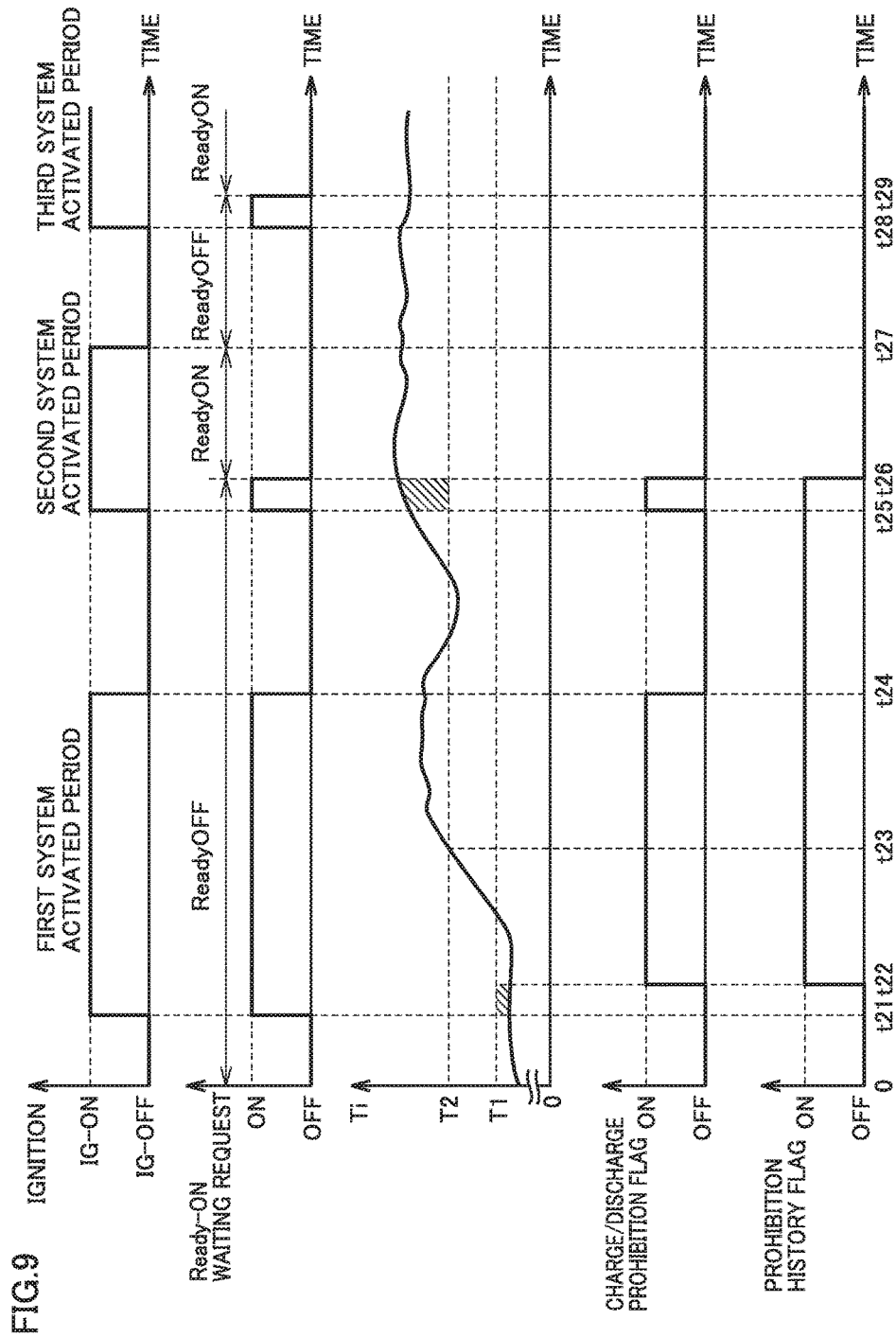

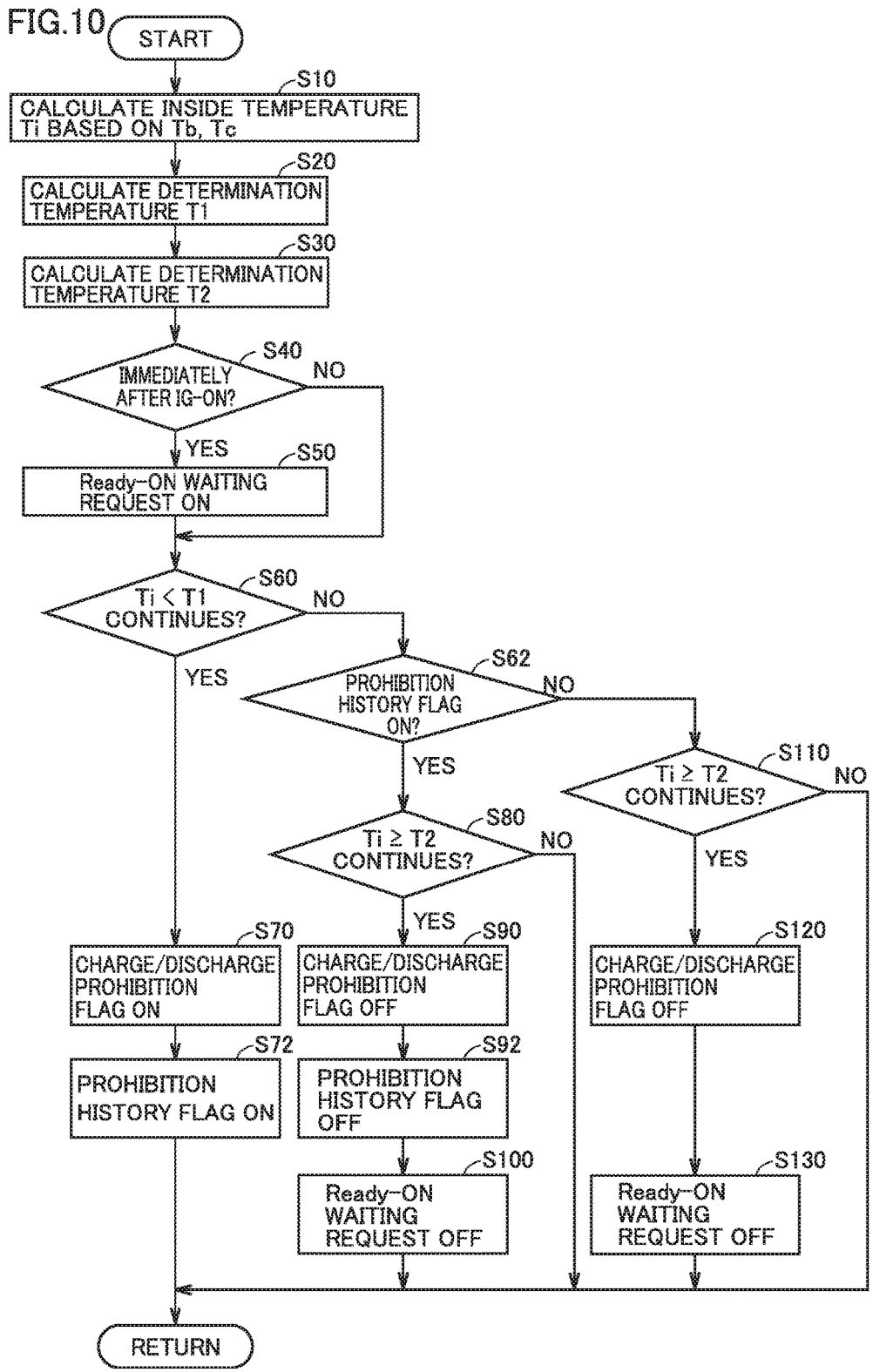

POWER STORAGE SYSTEM AND METHOD FOR CONTROLLING THE SAME

CROSS REFERENCE TO RELATED APPLICATIONS

This application is a National Stage of International Application No. PCT/JP2015/004937 filed Sep. 29, 2015, claiming priority based on Japanese Patent Application No. 2014-243112, filed Dec. 1, 2014, the contents of all of which are incorporated herein by reference in their entirety.

TECHNICAL FIELD

The present invention relates to a power storage system and a method for controlling the power storage system, and more specifically to a power storage system and a method for controlling the power storage system under a cryogenic environment.

BACKGROUND ART

It is known that charge/discharge of a battery at high electric power under a low-temperature environment (at −15° C. to −10° C., for example) accelerates deterioration of the battery, leading to a shortened battery life and an inability to exhibit sufficient battery performance. Therefore, a configuration for prohibiting charge/discharge depending on the temperature of a battery has been proposed. Japanese Patent Laying-Open No. 2010-252427 (PTL 1), for example, discloses a configuration in which a secondary battery is not charged when a temperature of the secondary battery detected by a temperature detecting means is lower than a prescribed temperature.

CITATION LIST

Patent Literature

[PTL 1] Japanese Patent Laying-Open No. 2010-252427
[PTL 2] Japanese Patent Laying-Open No. 2013-5663

SUMMARY OF INVENTION

Technical Problem

Under a cryogenic environment (at −35° C. to −30° C., for example), the electrolytic solution of a battery may solidify (freeze). Generally, the electrolytic solution of the battery begins to locally solidify with decreasing environmental temperature, and thereafter, the solidification of the electrolytic solution gradually proceeds, finally leading to complete solidification of the electrolytic solution. In this case, in order to protect the battery, it is desirable to prohibit charge/discharge even in the state in which the electrolytic solution is locally solidified. After the temperature of the battery has increased to cause the electrolytic solution to melt completely and return to a liquid, it is desirable to cancel the prohibition of charge/discharge. Therefore, it may be possible to set a determination temperature for determining the prohibition of charge/discharge and the cancellation of the prohibition.

If the determination temperature is set to be low, charge/discharge of the battery will not be easily prohibited, which allows the battery to be used over a wider range of temperatures. Thus, the user convenience can be enhanced. On the other hand, if the determination temperature is set to be excessively low, it is possible that the battery cannot be protected sufficiently. Therefore, when setting the determination temperature, it is desired that the user convenience be enhanced and the battery be protected at the same time.

The present invention was made to solve the aforementioned problem, and an object of the invention is to provide a technique for expanding the range of temperatures where a battery is usable while protecting the battery, in a power storage system.

Solution to Problem

A power storage system according to an aspect of the invention includes a battery containing an electrolytic solution, and a control device that controls, based on a temperature of the battery, permission and prohibition of charge/discharge of the battery. The control device sets a first determination temperature equal to or higher than a freezing point of the electrolytic solution and a second determination temperature higher than the first determination temperature. The control device prohibits charge/discharge of the battery when the temperature of the battery falls below the first determination temperature while the electrolytic solution is in a liquid state, and cancels the prohibition of charge/discharge of the battery when the electrolytic solution turns into the liquid from a state in which the electrolytic solution is at least partially solidified, and when the temperature of the battery exceeds the second determination temperature.

A method for controlling a power storage system according to another aspect of the invention includes the steps of setting a first determination temperature equal to or higher than a freezing point of an electrolytic solution of a battery; setting a second determination temperature higher than the first determination temperature; prohibiting charge/discharge of the battery when a temperature of the battery falls below the first determination temperature while the electrolytic solution is in a liquid state; and canceling the prohibition of charge/discharge of the battery when the electrolytic solution turns into a liquid from a state in which the electrolytic solution is at least partially solidified, and when the temperature of the battery exceeds the second determination temperature.

Owing to the nature of the electrolytic solution of the battery, hysteresis is present between the freezing point and the melting point of the electrolytic solution, with the freezing point being lower than the melting point. According to the above-described configuration and method, the first determination temperature for prohibiting charge/discharge of the battery when the temperature of the battery decreases and the second determination temperature for canceling the prohibition of charge/discharge of the battery when the temperature of the battery increases are set separately. This allows the battery to be used without prohibiting charge/discharge over a wide range of temperatures, using the first determination temperature lower than the second determination temperature, as compared to the case where the prohibition of charge/discharge and the cancellation of the prohibition are performed using the same determination temperature. Furthermore, the battery can be protected appropriately since the prohibition of charge/discharge of the battery is canceled in response to melting of the electrolytic solution, using the second determination temperature higher than the first determination temperature.

Preferably, the first determination temperature is set based on a relation between the freezing point of the electrolytic solution and a degree of deterioration of the battery. More preferably, the degree of deterioration is calculated using a rate of increase in internal resistance of the battery or a capacity retention rate of the battery.

A relation holds between the freezing point of the electrolytic solution and the degree of deterioration of the battery such that the freezing point of the electrolytic solution becomes higher as the deterioration of the battery proceeds. In this case, since the first determination temperature is set based on this relation, charge/discharge of the battery can be prohibited at an appropriate temperature in accordance with the state of the electrolytic solution.

Preferably, the second determination temperature is set to be higher than the melting point of the electrolytic solution by a prescribed temperature. In this case, the prohibition of charge/discharge is canceled after the electrolytic solution has melted completely. Therefore, the battery can be protected more reliably.

Preferably, the power storage system further includes an environmental temperature sensor configured to measure an environmental temperature of the battery, and a surface temperature sensor configured to measure a surface temperature of the battery. The control device calculates an inside temperature of the battery from the environmental temperature and the surface temperature, and controls, based on the inside temperature, the permission and prohibition of charge/discharge of the battery.

When the environmental temperature and the surface temperature of the battery differ from each other, thermal transfer occurs between the battery and the environment. This can result in a temporal difference between a change in the surface temperature and a change in the inside temperature of the battery. For example, when the environmental temperature decreases, a certain length of time is required until the surface temperature thereby decreases and then the inside temperature decreases. Alternatively, for example, when the battery surface is heated with a heater, a certain length of time is required until the inside temperature thereby increases. According to the above-described configuration, since the inside temperature is calculated from the environmental temperature and the surface temperature in consideration of heat transfer, charge/discharge of the battery can be prohibited at an appropriate temperature in accordance with the state of the electrolytic solution.

Preferably, the power storage system is mounted on an electric-powered vehicle. The electric-powered vehicle includes an operation unit for starting and shutting down a running system of the electric-powered vehicle. The control device is configured to prohibit charge/discharge of the battery when the temperature of the battery falls below the first determination temperature during an activated period that is a period from starting to shutting down of said running system by operation of said operation unit. The control device is configured to refrain from canceling the prohibition of charge/discharge of the battery even though the temperature of the battery exceeds the second determination temperature during the above-mentioned activated period, and cancel the prohibition of charge/discharge of the battery when the temperature of the battery exceeds the second determination temperature during an activated period after the above-mentioned activated period.

The running system of the electric-powered vehicle is started by a user switching ON the operation unit (an ignition switch, for example). If the temperature of the battery falls below the first determination temperature during this system activated period, charge/discharge of the battery is prohibited, so that the electric-powered vehicle enters a Ready-OFF state (unrunnable state). Furthermore, if the temperature of the battery exceeds the second determination temperature during the same activated period, it may be possible to cancel the prohibition of charge/discharge to cause the electric-powered vehicle to shift to a Ready-ON state (runnable state). In this case, however, the electric-powered vehicle shifts from the Ready-OFF state to the Ready-ON state even though the user has not operated the operation unit. This may cause the user discomfort. According to the above-described configuration, the prohibition of charge/discharge can be canceled after another system activated period is started by the user operation, so as to prevent user discomfort.

Advantageous Effects of Invention

According to the invention, it is possible to expand the range of temperatures where a battery is usable while protecting the battery, in a power storage system.

BRIEF DESCRIPTION OF DRAWINGS

FIGS. 4(A) and (B) are conceptual diagrams for explaining determination temperature T1 and determination temperature T2.

FIGS. 5(A) and (B) are diagrams for illustrating an exemplary method for calculating the degree of deterioration of the battery cell.

FIG. 9 is a time chart for explaining the charge/discharge control in an electric-powered vehicle on which a power storage system according to a second embodiment is mounted.

FIG. 10 is a flowchart for explaining the charge/discharge control in the electric-powered vehicle on which the power storage system according to the second embodiment is mounted.

Embodiments of the present invention will be described below in detail with reference to the drawings, in which the same or corresponding elements are designated by the same reference characters, and description thereof will not be repeated.

In the embodiments of the invention, description will be provided of a configuration where a power storage system according to the invention is mounted on a plug-in hybrid car configured to be capable of being charged from the outside of the vehicle (external charging). However, the electric-powered vehicle on which the power storage system according to the invention can be mounted is not limited thereto, and may also be a general hybrid car, an electric car, or a fuel car. Furthermore, the power storage system according to the invention can be used not only for vehicles but also for other purposes.

The term "charge/discharge" as used in the invention and embodiments of the invention means at least one of charge and discharge. In the embodiments of the invention, an example of a power storage system including, as a battery, a secondary battery configured to be capable of both being charged and discharged will be described. The battery, however, may also be a primary battery.

First Embodiment

<Configuration of Power Storage System>

Figure 1:
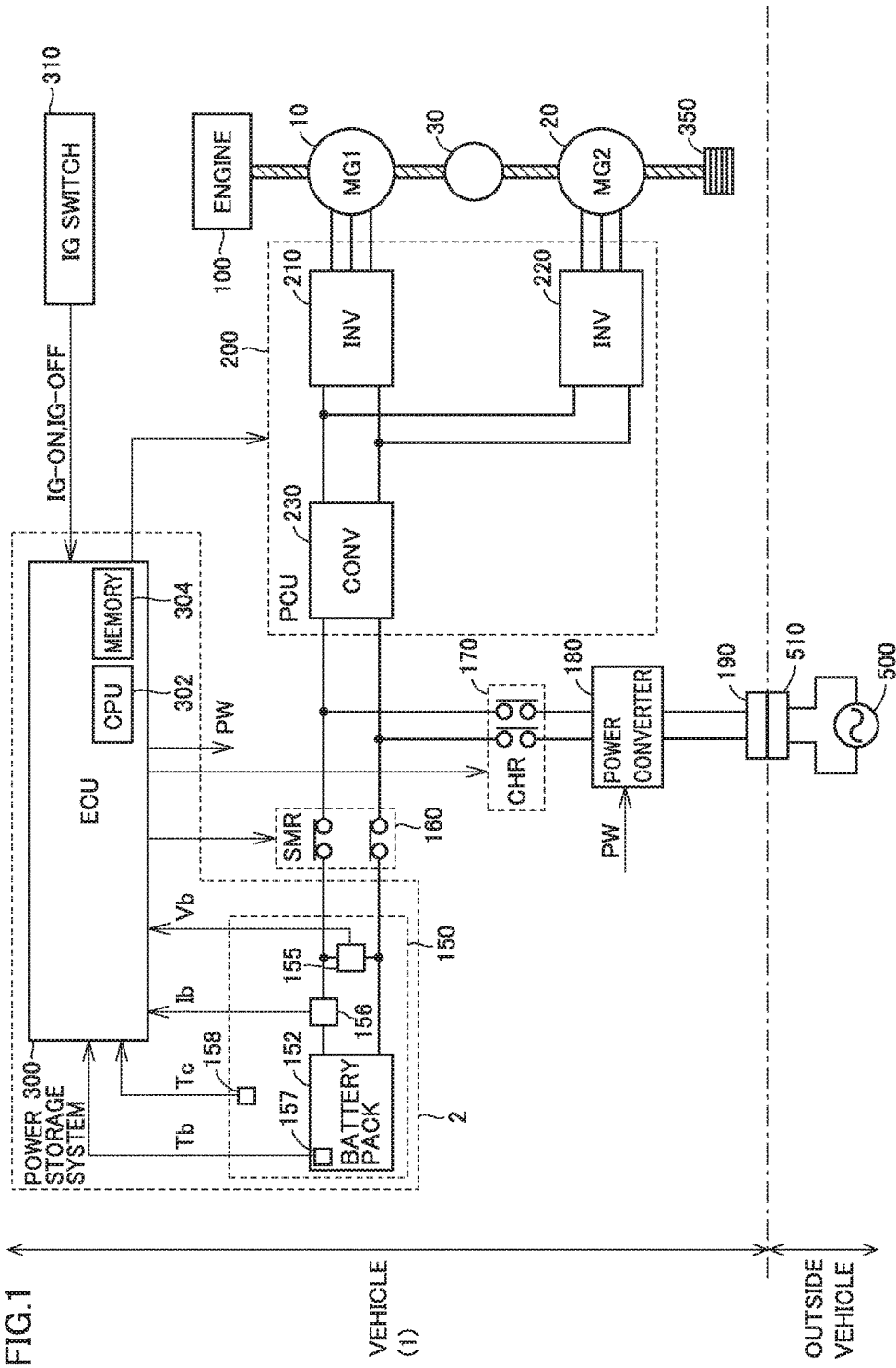
FIG. 1 is a block diagram schematically showing an entire configuration of an electric-powered vehicle on which a power storage system according to a first embodiment is mounted.

FIG. 1 is a block diagram schematically showing an entire configuration of an electric-powered vehicle on which a power storage system according to a first embodiment is mounted. Referring to FIG. 1, a vehicle 1 includes a power storage system 2, a system main relay (SMR) 160, a power control unit (PCU) 200, an engine 100, a first motor generator (MG) 10, a power split device 30, a second MG 20, and a drive wheel 350. Power storage system 2 includes a battery 150 and an electronic control unit (ECU) 300.

Vehicle 1 can run with a driving force output from at least one of engine 100 and second MG 20. Engine 100 is configured to include an internal combustion engine such as a gasoline engine or a diesel engine, for example. Engine 100, when cranked to start by first MG 10, supplies motive power to at least any of drive wheel 350 and first MG 10 via power split device 30.

Each of first MG 10 and second MG 20 is an AC rotating electric machine, for example, a three-phase AC permanent magnet type synchronous motor. First MG 10 can generate electric power using the motive power of engine 100 received via power split device 30. For example, when the SOC (State Of Charge) of battery 150 has reached a prescribed lower limit value, engine 100 is started to cause first MG 10 to generate electric power. The electric power generated by first MG 10 is converted by PCU 200 into a voltage for storage in battery 150 and for direct supply to second MG 20.

Second MG 20 generates a driving force using at least one of the electric power stored in battery 150 and the electric power generated by first MG 10. The driving force of second MG 20 is supplied to drive wheel 350 via a propeller shaft.

Power split device 30 is a planetary gear mechanism, for example, and is configured to split the driving force generated by engine 100 into motive power for driving drive wheel 350 and motive power for driving first MG 10.

PCU 200 is a drive device for driving first MG 10 and second MG 20, based on a control signal from ECU 300. PCU 200 includes an inverter 210 for converting a voltage between battery 150 and first MG 10, an inverter 220 for converting a voltage between battery 150 and second MG 20, and a converter 230 for increasing or reducing a DC voltage between battery 150 and inverters 210, 220.

SMR 160 is electrically connected between PCU 200 and battery 150. SMR 160 switches between supply and shutdown of electric power between PCU 200 and battery 150, based on the control signal from ECU 300. Note that engine 100, first MG 10, second MG 20, PCU 200, SMR 160, and the like correspond to a "running system" of vehicle 1 according to the invention.

Battery 150 is a rechargeable DC power supply, and is configured to include, for example, a secondary battery such as a lithium-ion battery, a nickel-metal hydride battery or the like, or a capacitor such as an electric double layer capacitor or the like. In this embodiment, an example where a battery pack of a lithium-ion secondary battery is used as a battery pack 152 will be described.

Battery 150 further includes a voltage sensor 155, a current sensor 156, a surface temperature sensor 157, and an environmental temperature sensor 158. Voltage sensor 155 detects a voltage Vb of battery 150. Current sensor 156 detects a current Ib input to and output from battery 150. Surface temperature sensor 157 detects a surface temperature Tb of battery 150. Environmental temperature sensor 158 detects an environmental temperature Tc of battery 150. Each sensor outputs the detection value to ECU 300. ECU 300 calculates the SOC of battery 150, based on the detection value from each sensor, and controls charge/discharge of battery 150.

Vehicle 1 further includes, as a configuration for external charging of battery 150, a charge relay (CHR) 170, a power converter 180, and a charging connector 190.

During external charging, CHR 170 is closed, and an external power supply 500 is electrically connected to charging connector 190 via a charging plug 510. External power supply 500 is generally formed by a commercial AC power supply. Power converter 180 is electrically connected between CHR 170 and charging connector 190 to convert an AC voltage from external power supply 500 into a DC voltage for charging battery 150. This DC voltage is supplied to battery 150 via CHR 170 and SMR 160. Note that vehicle 1 may be configured to externally feed power for supplying the electric power of battery 150 to the outside of the vehicle. In this case, charging connector 190 of vehicle 1 is electrically connected with a not-shown electric load (electric device, electric equipment, or another electric-powered vehicle, for example), in place of external power supply 500.

ECU 300 is configured to include a central processing unit (CPU) 302, a volatile and/or nonvolatile memory 304, an input/output buffer (not shown), and the like. ECU 300 outputs the control signal based on an input signal from each of the various sensors, and controls each device. More specifically, ECU 300 is connected with an ignition switch 310, for example, in addition to voltage sensor 155, current sensor 156, and surface temperature sensor 157 of battery 150.

Ignition switch (operation unit) 310 is turned ON/OFF by a user operation. When ignition switch 310 is turned ON, an IG-ON signal is output to ECU 300 from ignition switch 310. ECU 300, upon reception of the IG-ON signal, determines the ON/OFF of a Ready-ON wait request, as will be described in detail below with FIG. 7. When the Ready-ON wait request is ON, vehicle 1 is maintained in a Ready-OFF state even though ECU 300 has received the IG-ON signal. When the Ready-ON wait request is turned OFF, SMR 160 is turned from an open position to a closed position. This causes vehicle 1 to shift from the Ready-OFF state to the Ready-ON state.

On the other hand, if ignition switch 310 is turned OFF, an IG-OFF signal is output to ECU 300 from ignition switch 310. ECU 300, upon reception of the IG-OFF signal, shuts down engine 100, and switches SMR 160 from the closed position to the open position. This causes vehicle 1 to shift from the Ready-ON state to the Ready-OFF state. Note, however, that even in the ignition-OFF state, if charging connector 190 is inserted into charging plug 510 for external charging, SMR 160 and CHR 170 are closed. As a result, AC electric power from external power supply 500 can be converted by power converter 180 into DC electric power for supply to battery 150.

Figure 2:
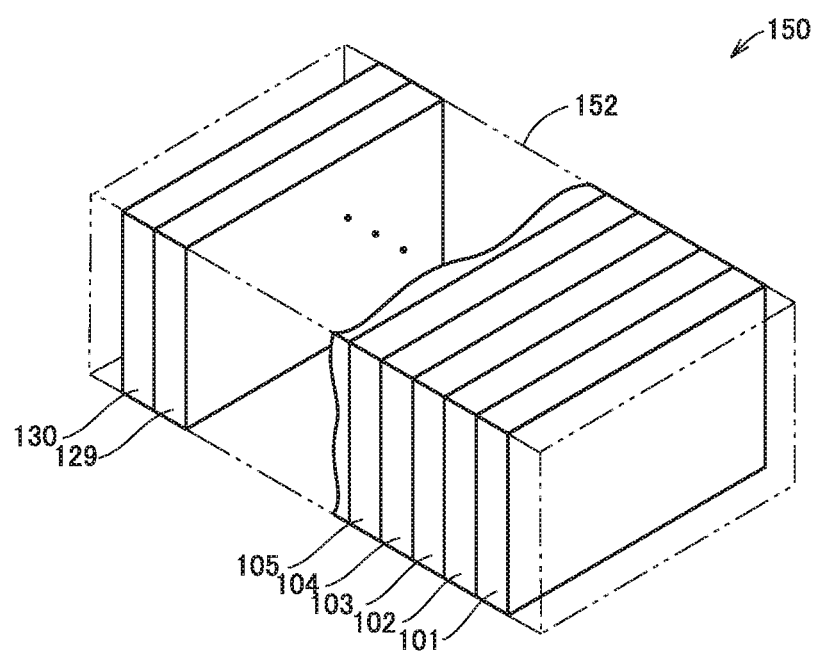
FIG. 2 is a perspective view schematically showing the configuration of the battery shown in FIG. 1.

FIG. 2 is a perspective view schematically showing the configuration of battery 150 shown in FIG. 1. Referring to FIG. 2, in this embodiment, a configuration of battery pack 152 where, for example, thirty battery cells 101 to 130 are arranged will be described. While a battery pack including about several tens to a hundred battery cells is often used as a vehicle-mounted battery, the number of battery cells is not particularly limited. Since the configuration of each of battery cells 101 to 130 is the same, the configuration of representative battery cell 101 will be described below.

Figure 3:
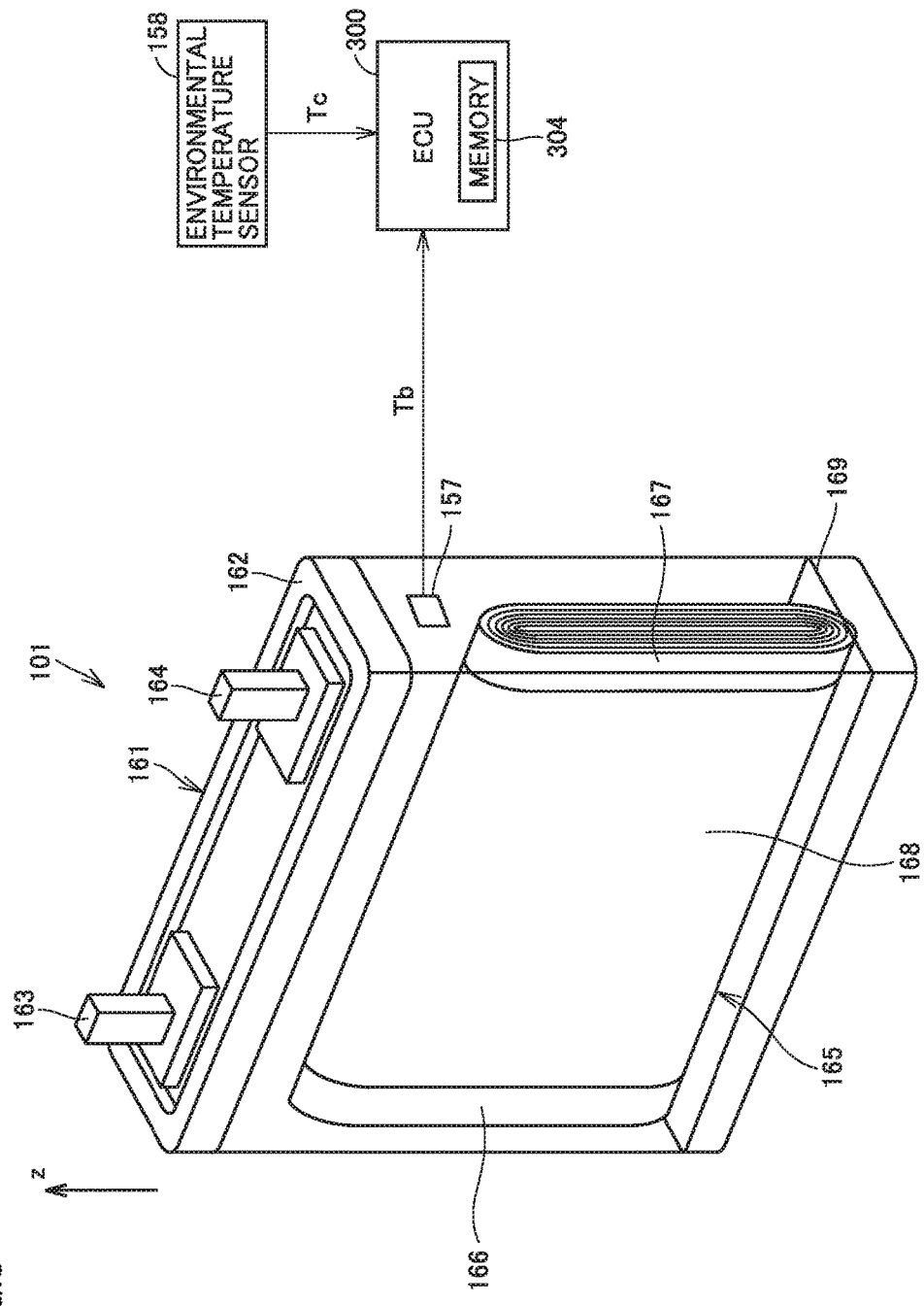
FIG. 3 is a diagram for explaining the configuration of a battery cell shown in FIG. 2 in more detail.

FIG. 3 is a diagram for explaining the configuration of battery cell 101 shown in FIG. 2 in more detail. In FIG. 3, battery cell 101 is shown with its inside seen through. Referring to FIG. 3, battery cell 101 has a battery case 161 with a substantially rectangular parallelepiped shape. A top face (upper face in the z-axis direction) of battery case 161 is sealed with a lid 162. Lid 162 is provided with a positive electrode terminal 163 and a negative electrode terminal 164 for external connection. One end of each of positive electrode terminal 163 and negative electrode terminal 164 protrudes to the outside from lid 162. The other ends of positive electrode terminal 163 and negative electrode terminal 164 are electrically connected to an inside positive electrode terminal and an inside negative electrode terminal (neither illustrated) within battery case 161.

An electrode body 165 is contained within battery case 161. Electrode body 165 has a wound shape in which a positive electrode sheet 166 and a negative electrode sheet 167 stacked on each other with a separator 168 sandwiched therebetween are wound in a tube form. Separator 168 is arranged to be in contact with both a positive electrode active material layer (not shown) formed on positive electrode sheet 166 and a negative electrode active material layer (not shown) formed on negative electrode sheet 167. Pores are formed in separator 168, which are filled with an electrolytic solution.

As the electrolytic solution, a mixed solvent of dimethyl carbonate (DMC), ethyl methyl carbonate (EMC), and ethylene carbonate (EC), for example, is used. In this organic solvent, a lithium salt such as lithium hexafluorophosphate ($LiPF_6$) or the like is dissolved as an electrolyte. Excess electrolytic solution 169 is stored in a bottom portion (lower portion in the z-axis direction) of battery case 161.

ECU 300 calculates an inside temperature Ti of battery cell 101 based on surface temperature Tb of battery cell 101 detected by surface temperature sensor 157 and environmental temperature Tc of battery cell 101 detected by environmental temperature sensor 158. This calculation method will be described in detail below.

<Solidification and Melting of Electrolytic Solution>

In power storage system 2 having the above-described configuration, the electrolytic solution of each battery cell within battery 150 may solidify under a cryogenic environment. Generally, the electrolytic solution begins to locally solidify with decreasing environmental temperature, and thereafter, the solidification of the electrolytic solution gradually proceeds, finally leading to complete solidification of the electrolytic solution. When the electrolytic solution is locally solidified, even though battery 150 is capable of being charged/discharged, the charge/discharge current concentrates on an unsolidified portion of the electrolytic solution. Thus, the current density on the portion where the electrolytic solution is not solidified may exceed an acceptable value. As a result, appropriate protection of battery 150 may not be achieved. It is thus desirable to set determination values for prohibiting charge/discharge of the battery and canceling the prohibition, such that charge/discharge is prohibited prior to the electrolytic solution being solidified, even locally, and the prohibition of charge/discharge is canceled after the electrolytic solution has melted completely.

The present inventor focused on the fact that owing to the nature of the electrolytic solution used in battery 150, hysteresis is present between the freezing point (temperature at which the solidification begins) and the melting point (temperature at which melting begins), with the freezing point being lower than the melting point. That is, when the temperature of the electrolytic solution decreases, the electrolytic solution is not likely to solidify until the temperature of the electrolytic solution reaches the freezing point lower than the melting point. In contrast, when the temperature of the electrolytic solution increases, the electrolytic solution is not likely to melt until the temperature of the electrolytic solution reaches the melting point higher than the freezing point.

In this embodiment, therefore, a configuration is used where determination temperature T1 (first determination temperature) for determining the prohibition of charge/discharge of battery 150 and determination temperature T2 (second determination temperature) for determining the cancellation of the prohibition of charge/discharge are provided separately.

FIGS. 4(A) and (B) are conceptual diagrams for explaining determination temperature T1 and determination temperature T2. FIG. 4(A) shows a method for setting determination temperatures T1, T2 according to this embodiment, and FIG. 4(B) shows a method for setting a determination temperature according to a comparative example. Here, description will be provided assuming a situation where the electrolytic solution solidifies due to a decrease in inside temperature Ti of battery cell 101 (which can be approximated to be equal to the temperature of the electrolytic solution), and then the electrolytic solution melts due to an increase in inside temperature Ti.

Referring to FIG. 4(A), when inside temperature Ti decreases, if inside temperature Ti is higher than freezing point Tf, the electrolytic solution is liquid.

When inside temperature Ti has reached freezing point Tf, the electrolytic solution begins to locally solidify. Thereafter, the solidification of the electrolytic solution gradually proceeds, finally leading to complete solidification of the electrolytic solution. Alternatively, the temperature may begin to increase before the electrolytic solution completely solidifies.

In this embodiment, determination temperature T1 is set to be equal to or higher than a temperature at which the solidification of the electrolytic solution begins (freezing point Tf). When the temperature decreases, if inside temperature Ti is higher than determination temperature T1 while the electrolytic solution is liquid, charge/discharge of battery 150 is permitted. On the other hand, when inside temperature Ti has become equal to or lower than determination temperature T1, charge/discharge of battery 150 is prohibited.

On the other hand, when inside temperature Ti increases, owing to the nature of the electrolytic solution, melting point Tm is higher than freezing point Tf. When inside temperature Ti has reached melting point Tm, the electrolytic solution begins to melt. Melting of the electrolytic solution proceeds while inside temperature Ti continues to be equal to melting point Tm, leading to complete melting of the electrolytic solution.

Determination temperature T2 is set to be higher than determination temperature T1. When the temperature increases, the electrolytic solution turns into a liquid completely from the state in which the electrolytic solution is partially or completely solidified, and when inside temperature Ti is equal to or lower than determination temperature T2, the prohibition of charge/discharge of battery 150 is continued. On the other hand, when inside temperature Ti has exceeded determination temperature T2, the prohibition of charge/discharge of battery 150 is canceled (charge/discharge is permitted).

<Determination Temperature T1>

Next, referring to FIG. 4(B), the method for setting determination temperature T1 will be described in detail. As in the comparative example shown in FIG. 4(B), it may be possible to set a common determination temperature T0 for the time when inside temperature Ti decreases and for the time when inside temperature Ti increases. For example, when determination temperature T0 is set to be higher than melting point Tm, charge/discharge is prohibited before the electrolytic solution begins to solidify, and thus, the battery can be protected. However, when the temperature decreases, while the inside temperature decreases from determination temperature T0 to freezing point Tf, charge/discharge of the battery is prohibited even though the electrolytic solution is not solidified. That is, because the range of temperatures where charge/discharge of the battery is prohibited is excessively wide, the user convenience may be impaired.

In contrast, in this embodiment, as shown in FIG. 4(A), determination temperature T1 is set to be equal to or higher than freezing point Tf of the electrolytic solution and lower than melting point Tm of the electrolytic solution. In this way, charge/discharge of battery 150 is also permitted while inside temperature Ti decreases from melting point Tm to determination temperature T1, resulting in a wide range of temperatures where the battery can be charged/discharged, as compared to that in the comparative example. Thus, the user convenience can be enhanced.

While determination temperature T1 may be set as a fixed value, it is preferably changed in accordance with the progress of the deterioration of battery 150 (degree of deterioration).

FIGS. 5(A) and (B) are diagrams for illustrating an exemplary method for calculating the degree of deterioration of battery cell 101. A rate of increase in internal resistance (a ratio of internal resistance at the current time relative to the internal resistance in an initial state (in the state as manufactured, for example) of the battery cell) can be used as the degree of deterioration of battery cell 101, as shown in FIG. 5(A), for example. As the rate of increase in the internal resistance of battery cell 101 increases, the degree of deterioration is calculated to be greater. Alternatively, as shown in FIG. 5(B), a capacity retention rate (a ratio of capacity at the current time relative to the capacity in the initial state of the battery cell) may be used. As the capacity retention rate of battery cell 101 decreases, the degree of deterioration is calculated to be greater.

Figure 6:
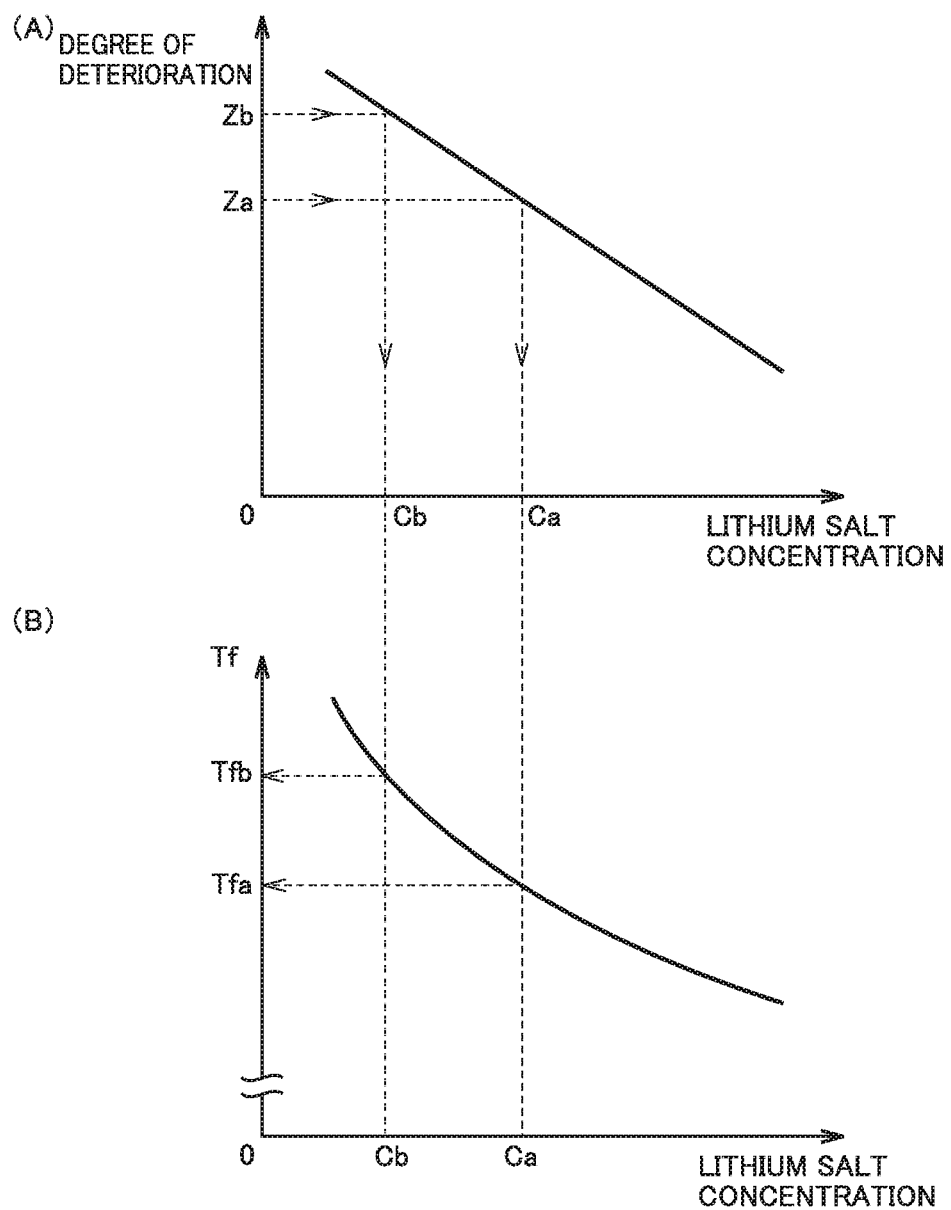
FIGS. 6(A) and (B) are diagrams for explaining a method for calculating determination temperature T1.

FIGS. 6(A) and (B) are diagrams for explaining a method for calculating determination temperature T1 in more detail. In each of FIGS. 6(A) and (B), the horizontal axis represents the lithium salt concentration in battery cell 101 (unit: mol/L). The vertical axis in FIG. 6(A) represents the degree of deterioration of battery cell 101. The vertical axis in FIG. 6(B) represents freezing point Tf of the electrolytic solution of battery cell 101.

Referring to FIG. 6(A), generally, the lithium salt concentration in the electrolytic solution decreases as the deterioration of the battery cell proceeds. More specifically, when the deterioration of the battery cell proceeds, the internal resistance in the battery cell increases, or the capacity of the battery cell decreases. Then, the lithium salt concentration in the electrolytic solution decreases with increasing internal resistance or decreasing capacity. Memory 304 of ECU 300 stores a correlation between the degree of deterioration of battery cell 101 and the lithium salt concentration in the electrolytic solution as shown in FIG. 6(A), in the form of map M1 (not shown), for example.

Next, referring to FIG. 6(B), as the lithium salt concentration increases, freezing point Tf of the electrolytic solution decreases due to depression of freezing point. Memory 304 of ECU 300 also stores a correlation between freezing point Tf of the electrolytic solution and the lithium salt concentration as shown in FIG. 6(B), in the form of map M2 (not shown), for example.

By reference to map M1, ECU 300 calculates, from a degree of deterioration Za of battery cell 101, a lithium salt concentration Ca corresponding to the degree of deterioration Za. Furthermore, by reference to map M2, ECU 300 calculates a freezing point Tfa corresponding to lithium salt concentration Ca, from lithium salt concentration Ca. In this way, ECU 300 can calculate freezing point Tf of the electrolytic solution based on the degree of deterioration of battery cell 101.

As described above, determination temperature T1 is set to be equal to or higher than freezing point Tf. When the deterioration of battery 150 proceeds to cause the degree of deterioration from Za to Zb, freezing point Tf increases from Tfa to Tfb. In this case, along with the increase in freezing point Tf, determination temperature T1 is preferably changed from a value equal to or higher than Tfa to a value equal to or higher than Tfb. In this way, by setting determination temperature T1 based on the relation between freezing point Tf of the electrolytic solution and the degree of deterioration of battery 150, charge/discharge of battery 150 can be prohibited at an appropriate temperature in accordance with the state of the electrolytic solution.

Note that ECU 300 may have, in place of maps M1 and M2, another map directly indicating a correlation between freezing point Tf of the electrolytic solution and the degree of deterioration of battery cell 101. Furthermore, the method for calculating freezing point Tf is not limited to the use of a map. For example, freezing point Tf may be calculated using a prescribed function.

<Determination Temperature T2>

Next, returning to FIG. 4, the method for setting determination temperature T2 will be described. Even when inside temperature Ti increases to reach melting point Tm, a certain length of time is required until the electrolytic solution melts completely. This will now be described more specifically. The temperature of the electrolytic solution that is melting after having solidified once is constant at melting point Tm. After the electrolytic solution has substantially completely melted, the temperature of the electrolytic solution begins to increase from melting point Tm. Therefore, for the electrolytic solution to melt completely, determination temperature T2 is preferably set to be higher than melting point Tm by a prescribed temperature $\Delta T$. The degree of $\Delta T$ can be set as appropriate, based on simulation results or experimental results, taking into account a calculation error in inside temperature Ti. Setting determination temperature T2 as described above ensures that battery 150 is charged/discharged with the electrolytic solution being melted completely. Therefore, battery 150 can be protected more reliably.

<Calculation of Inside Temperature>

In the foregoing description, inside temperature Ti of battery cell 101 is used as the temperature of the electrolytic solution. Although it would be preferable that a temperature sensor be provided within battery cell 101 to detect the temperature of the electrolytic solution very accurately, such a configuration is difficult to realize. Therefore, inside temperature Ti is calculated in consideration of heat transfer between battery 150 and the environment, based on surface temperature Tb of battery cell 101 detected by surface temperature sensor 157 and environmental temperature Tc of battery cell 101 detected by environmental temperature sensor 158. An example of this calculation method will be described in detail below.

Referring back to FIG. 3, when the surface area of battery case 161 is denoted as S (unit: $m^2$), and the convective heat transfer coefficient from battery case 161 to the outside air is denoted as h (unit: $W/(m^2 \times K)$), a heat radiation quantity Qt (unit: W) from battery case 161 by convection is represented by the following equation (1):

$$Qt=(Tb-Tc) \times S \times h \tag{1}$$

Furthermore, when the surface emissivity is denoted as p (dimensionless number), and the Stefan-Boltzmann constant is denoted as σ (unit: $W/(m^2 \times K^4)$),
a heat radiation quantity Qh (unit: W) from battery case 161 by radiation is represented by the following equation (2):

$$Qh=(Tb^4-Tc^4) \times S \times p \times \sigma \tag{2}$$

Here, when the thickness of battery case 161 (for example, the thickness of the aluminum alloy sheet used for battery case 161) is denoted as d (unit: m), and when the thermal conductivity is denoted as K (unit: $W/(m \times K)$), the following equation (3) holds between a temperature difference between inside temperature Ti and surface temperature Tb, and a sum of the heat radiation quantities (Qt+Qh):

$$(Ti-Tb) \times K \times S/d = Qt+Qh \tag{3}$$

When equation (3) is modified by substituting equations (1) and (2) into equation (3), and the constants are expressed with α, β (α>0, β>0), the following equation (4) for inside temperature Ti is derived:

$$Ti=Tb+\alpha(Tb-Tc)+\beta(Tb^4-Tc^4) \tag{4}$$

From equation (4), it is seen that inside temperature Ti is expressed as a function of surface temperature Tb and environmental temperature Tc. Therefore, a relation that holds between inside temperature Ti, surface temperature Tb, and environmental temperature Tc is stored in advance as map M within memory 304 in ECU 300. This allows inside temperature Ti to be calculated based on surface temperature Tb and environmental temperature Tc. Note that map M is preferably created taking into account an error in each of surface temperature sensor 157 and environmental temperature sensor 158.

As described above, in this embodiment, since inside temperature Ti is calculated from surface temperature Tb and environmental temperature Tc in consideration of heat transfer between battery 150 and the environment, charge/discharge of battery 150 can be prohibited at an appropriate temperature in accordance with the state of the electrolytic solution.

Note that while battery cell 101 has been herein described, since battery cells 101 to 130 have the same configuration, they are all provided with a surface temperature sensor. In this case, inside temperature Ti is preferably calculated using the lowest value of surface temperatures Tb detected by all the surface temperature sensors. In doing so, according to equation (4) above, inside temperature Ti is calculated to be the lowest, so that inside temperature Ti easily falls below determination temperature T1. As a result, charge/discharge is prohibited at an earlier stage, and thus, battery 150 can be protected more reliably.

Alternatively, battery 150 may be provided with a plurality of environmental temperature sensors. In this case, preferably, the highest value of environmental temperatures Tc detected by all of the environmental temperature sensors is used as environmental temperature Tc. According to equation (4) above, as environmental temperature Tc increases, inside temperature Ti is calculated to be lower, so that inside temperature Ti easily falls below determination temperature T1. Therefore, battery 150 can be protected more reliably.

<Control of Electric-Powered Vehicle>

It is desirable to determine whether or not charge/discharge of battery 150 in vehicle 1 needs to be prohibited prior to the start of running, rather than during running. In the following, assuming a situation where vehicle 1 is parked under a cryogenic environment, control when ignition switch 310 is turned ON will be described. Note that as an example, the following control is not executed during external charging or external power feed, and is executed when the running system is activated under normal conditions.

Figure 7:
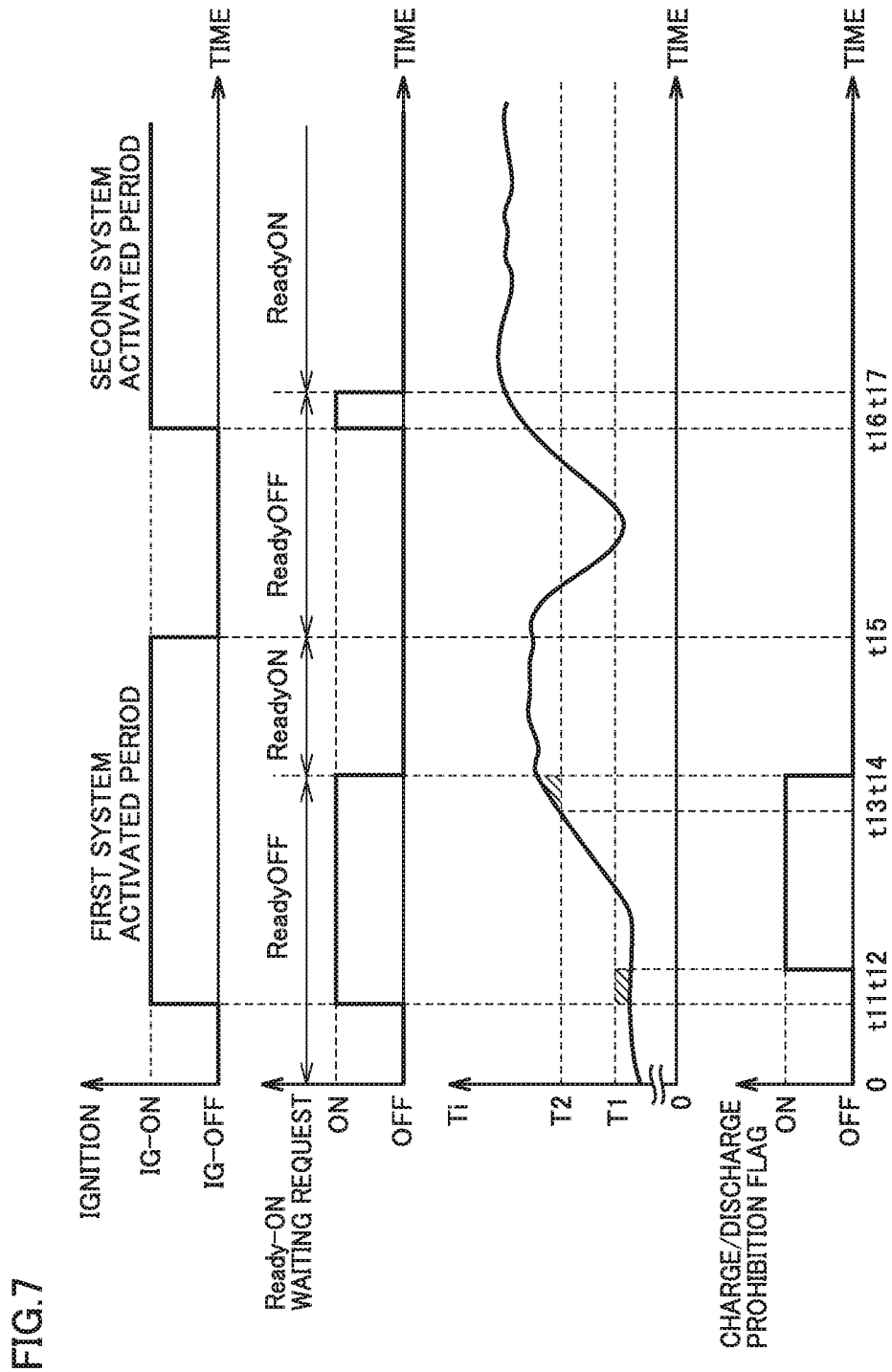
FIG. 7 is a time chart for explaining charge/discharge control in the electric-powered vehicle on which the power storage system according to the first embodiment is mounted.

FIG. 7 is a time chart for explaining the charge/discharge control in vehicle 1 on which power storage system 2 according to the first embodiment is mounted. The horizontal axis in FIG. 7 represents elapsed time. The vertical axes in FIG. 7 in order from the top represent the ON/OFF state of ignition, the ON/OFF state of the Ready-ON wait request, inside temperature Ti, and the ON/OFF state of a charge/discharge prohibition flag.

Referring to FIGS. 1 and 7, at start time (0), ignition switch 310 is OFF, and inside temperature Ti of battery 150, which has been cooled at a cryogenic temperature, is lower than determination temperature T1. Note, however, that charge/discharge prohibition flag is OFF.

At time t11, when ignition switch 310 is turned ON, a first system activated period starts. The term "system activated period" means a period between the time when the running system is started by turning ignition switch 310 ON and the time when the running system is shut down by turning ignition switch 310 OFF.

In the first embodiment, at the start of the system, the Ready-ON wait request is turned ON regardless of the ON/OFF of the charge/discharge prohibition flag, in order to prevent, in the case where the charge/discharge prohibition flag is OFF, battery 150 from being charged/discharged immediately after ignition is turned ON even though inside temperature Ti is low. While the Ready-ON wait request is ON, vehicle 1 is maintained in the Ready-OFF state.

When a prescribed period has passed with inside temperature Ti being lower than determination temperature T1, at time t12, the charge/discharge prohibition flag is turned from OFF to ON. This causes charge/discharge of battery 150 to be prohibited, which causes the Ready-ON wait request to be held ON.

Thereafter, inside temperature Ti gradually increases, and reaches determination temperature T2 at time t13. When a prescribed period has passed with inside temperature Ti being equal to or higher than determination temperature T2, at time t14, the charge/discharge prohibition flag is turned from ON to OFF. This causes the Ready-ON wait request to be turned from ON to OFF. Vehicle 1 therefore shifts from the Ready-OFF state to the Ready-ON state.

At time t15, when ignition switch 310 is turned OFF, the first system activated period ends. This causes vehicle 1 to enter the Ready-OFF state.

At time t16, when ignition switch 310 is turned ON again, a second system activated period starts. As described above, at the start of the system, the Ready-ON wait request is turned ON. Since inside temperature Ti is higher than determination temperature T2, the charge/discharge prohibition flag is held OFF. Therefore, at time t17, the Ready-ON wait request is turned from ON to OFF, which causes vehicle 1 to shift from the Ready-OFF state to the Ready-ON state.

Figure 8:
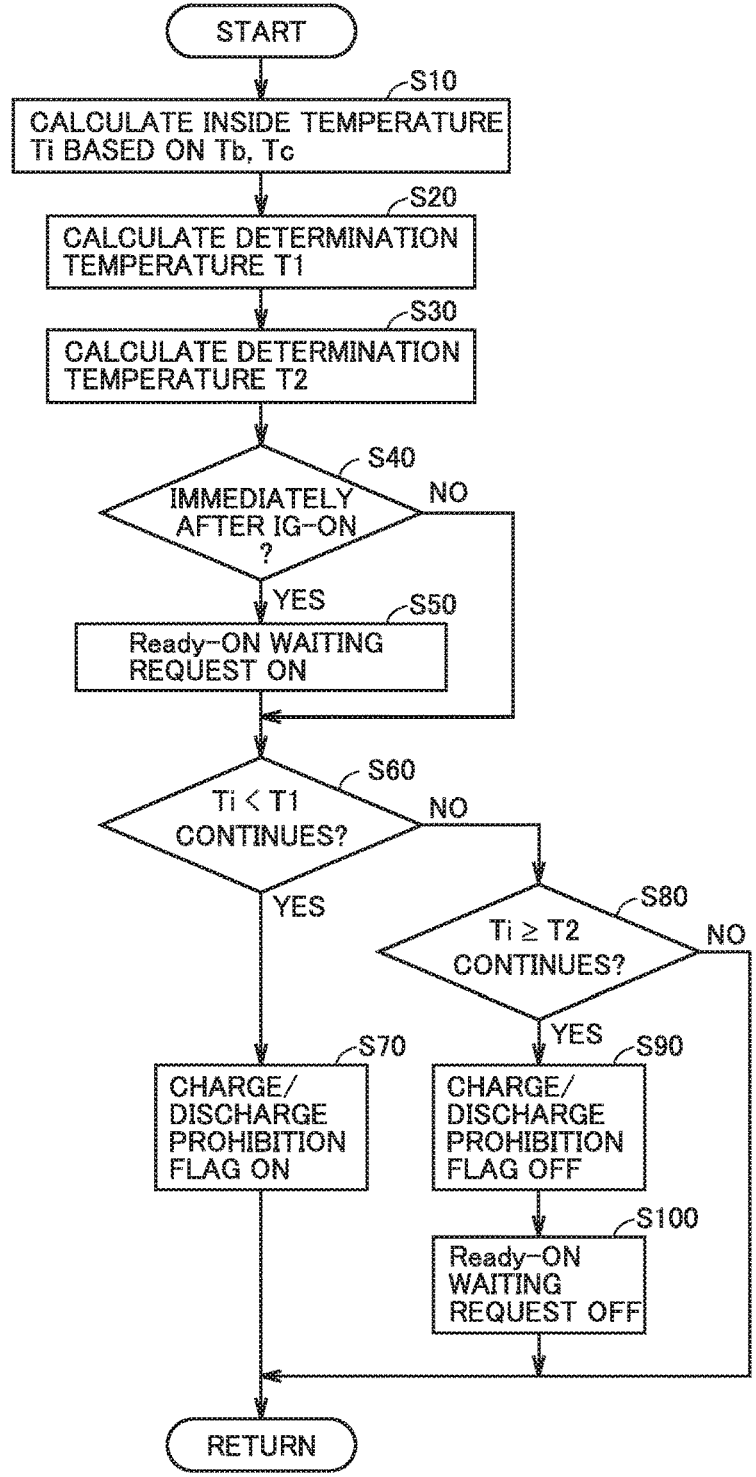
FIG. 8 is a flowchart for explaining the charge/discharge control in the electric-powered vehicle on which the power storage system according to the first embodiment is mounted.

FIG. 8 is a flowchart for explaining charge/discharge control in vehicle 1 on which power storage system 2 according to the first embodiment is mounted. The flowchart shown in FIG. 8 is invoked from a main routine and executed when, for example, ignition switch 310 is turned ON. Note that while each step in this flowchart is basically implemented by software processing by ECU 300, it may also be implemented by hardware (electronic circuit) fabricated in ECU 300.

Referring to FIGS. 1, 7, and 8, in S10, ECU 300 calculates inside temperature Ti based on surface temperature Tb and environmental temperature Tc. Since this calculation method has been already described in detail, the description thereof will not be repeated here.

In S20, ECU 300 calculates determination temperature T1. In S30, ECU 300 calculates determination temperature T2. Since this calculation method has also been described in detail with FIGS. 4 and 5, the description thereof will not be repeated here.

Where ignition switch 310 has just now been turned ON (YES in S40), ECU 300 turns ON the Ready-ON wait request (S50) (see time t11, t16 in FIG. 7). If not so (NO in S40), ECU 300 skips S50 and causes the processing to proceed to S60.

In S60, ECU 300 compares which of inside temperature Ti and determination temperature T1 is higher or lower. Where inside temperature Ti has continued to be lower than determination temperature T1 for a prescribed period (YES in S60), ECU 300 turns ON the charge/discharge prohibition flag (S70) (see time t12 in FIG. 7). This causes the Ready-ON wait request to be held ON to cause vehicle 1 to be maintained in the Ready-OFF state.

When the charge/discharge flag is to be turned OFF from ON, it is possible that an erroneous determination may be made that inside temperature Ti is lower than determination temperature T1, for a reason such as, for example, noise superimposed on the signal from surface temperature sensor 157 or environmental temperature sensor 158. In this case, even though vehicle 1 is actually in a runnable state, charge/discharge of battery 150 is prohibited, causing vehicle 1 to be incapable of running. Therefore, preferably, the charge/discharge flag is turned OFF from ON more carefully, that is, after inside temperature Ti has continued to be lower than determination temperature T1 for a prescribed period. ECU 300 then returns the processing to the main routine.

On the other hand, where inside temperature Ti is equal to or higher than determination temperature T1, or where inside temperature Ti does not continue to be lower than determination temperature T1 for a prescribed period in S60 (NO in S60), ECU 300 compares which of inside temperature Ti and determination temperature T2 is higher or lower (S80). Where inside temperature Ti continues to be equal to or higher than determination temperature T2 for a prescribed period (YES in S80), ECU 300 turns the charge/discharge prohibition flag from ON to OFF (S90). ECU 300 then turns the Ready-ON wait request from ON to OFF (S100) (see time t14 in FIG. 7). This causes vehicle 1 to shift from the Ready-OFF state to the Ready-ON state.

Where inside temperature Ti is lower than determination temperature T2, or where inside temperature Ti does not continue to be equal to or higher than determination temperature T2 for a prescribed period in S80 (NO in S80), ECU 300 skips S90 and S100, and returns the processing to the main routine. That is, vehicle 1 is maintained in the Ready-OFF state.

As described above, according to the first embodiment, determination temperature T1 for prohibiting charge/discharge of battery 150 when the temperature of battery 150 decreases and determination temperature T2 for canceling the prohibition of charge/discharge of battery 150 when the temperature of battery 150 increases are set separately. Therefore, battery 150 can be used over a wide range of temperatures without prohibiting charge/discharge, using determination temperature T1, as compared to the case where the same determination temperature is used for prohibiting charge/discharge and canceling the prohibition, as in the comparative example shown in FIG. 4(B). Furthermore, battery 150 can be protected appropriately since the prohibition of charge/discharge of battery 150 is canceled in response to melting of the electrolytic solution, using determination temperature T2.

Second Embodiment

In the first embodiment, an example has been described in which in the case where charge/discharge of the battery is prohibited during one system activated period to cause the vehicle to enter the Ready-OFF state, if the inside temperature is increased, the prohibition of charge/discharge is canceled even during the same system activated period to cause the vehicle to shift to the Ready-ON state (see time t14 in FIG. 7). In this case, however, the vehicle shifts from the Ready-OFF state to the Ready-ON state even though the user has not performed any particular operation. This may cause the user discomfort. In the second embodiment, therefore, a configuration will be described in which during the same system activated period, the prohibition of charge/discharge is not canceled even if the inside temperature is increased, and the prohibition of charge/discharge is canceled after another system activated period is started by a user operation.

In the second embodiment, ECU 300 has a prohibition history flag for managing the ON/OFF of the charge/discharge prohibition flag during a past (previous) system activated period. Note that a vehicle on which a power storage system according to the second embodiment is mounted is otherwise identical in configuration to vehicle 1 shown in FIGS. 1 to 3, and thus, detailed description thereof will not be repeated.

FIG. 9 is a time chart for explaining the charge/discharge control in vehicle 1 on which power storage system 2 according to the second embodiment is mounted. The vertical axis of the time chart of FIG. 9 represents the ON/OFF state of the prohibition history flag, in addition to the items represented by the vertical axis of the time chart of FIG. 7. The prohibition history flag at the start time is OFF.

Referring to FIG. 9, at time t21, when ignition switch 310 is turned ON, a first system activated period starts. When a prescribed period has passed with inside temperature Ti being lower than determination temperature T1, at time t22, the charge/discharge prohibition flag is turned ON, and the prohibition history flag is turned from OFF to ON. This causes charge/discharge of battery 150 to be prohibited, causing the Ready-ON wait request to be held ON.

At time t23, inside temperature Ti reaches determination temperature T2. In the second embodiment, even though inside temperature Ti continues to be equal to or higher than determination temperature T2 as in the period from time t23 to time t24, the charge/discharge prohibition flag is held ON during the first system activated period. This causes the Ready-ON wait request to be held ON to cause vehicle 1 to be maintained in the Ready-OFF state. Then, at time t24, the first system activated period ends.

At time t25, when ignition switch 310 is turned ON again, a second system activated period starts. At the start of the system, the Ready-ON wait request is turned ON.

Here, since the prohibition history flag is ON, charge/discharge prohibition flag is also turned ON once. However, since inside temperature Ti is equal to or higher than determination temperature T2, at time t26, the charge/discharge prohibition flag is turned from ON to OFF, and the prohibition history flag is turned from ON to OFF. This causes the Ready-ON wait request to be turned from ON to OFF, which causes vehicle 1 to shift from the Ready-OFF state to the Ready-ON state. Then, at time t27, the second system activated period ends.

At time t28, when ignition switch 310 is turned ON again, the third system activated period starts. At the start of the system, the Ready-ON wait request is turned ON. Since the prohibition history flag is OFF, the charge/discharge prohibition flag is also OFF. Since inside temperature Ti is higher than determination temperature T2, at time t29, the Ready-ON wait request is turned from ON to OFF, which causes vehicle 1 to shift from the Ready-OFF state to the Ready-ON state.

FIG. 10 is a flowchart for explaining the charge/discharge control in vehicle 1 on which power storage system 2 according to the second embodiment is mounted. Referring to FIG. 10, since the processing until S60 is the same as the processing corresponding to that in the flowchart shown in FIG. 8, detailed description thereof will not be repeated.

In S60, where inside temperature Ti continues to be lower than determination temperature T1 for a prescribed period (YES in S60), ECU 300 turns ON the charge/discharge prohibition flag (S70), and then turns ON the prohibition history flag (S72) (see time t22 in FIG. 9). This causes the Ready-ON wait request to be held ON to cause vehicle 1 to be maintained in the Ready-OFF state. ECU 300 then returns the processing to the main routine.

On the other hand, where inside temperature Ti is equal to or higher than determination temperature T1, or where inside temperature Ti does not continue to be lower than determination temperature T1 for a prescribed period in S60 (NO in S60), ECU 300 determines whether or not the prohibition history flag is ON (S62).

Where the prohibition history flag is ON (YES in S62), and where inside temperature Ti continues to be equal to or higher than determination temperature T2 for a prescribed period (YES in S80), ECU 300 turns the charge/discharge prohibition history flag from ON to OFF (S90), and turns the prohibition history flag from ON to OFF (S92). ECU 300 then turns the Ready-ON wait request from ON to OFF (S100) (see time t26 in FIG. 9). This causes vehicle 1 to shift from the Ready-OFF state to the Ready-ON state.

Where the prohibition history flag is OFF in S62 (NO in S62), and where inside temperature Ti continues to be equal to or higher than determination temperature T2 for a prescribed period (YES in S110), ECU 300 holds the charge/discharge prohibition flag OFF (S120). ECU 300 then turns the Ready-ON wait request from ON to OFF (S130) (see time t29 in FIG. 9). This causes vehicle 1 to shift from the Ready-OFF state to the Ready-ON state.

Note that where inside temperature Ti is lower than determination temperature T2, or where inside temperature Ti does not continue to be equal to or higher than determination temperature T2 for a prescribed period in S80 or S110 (NO in S80 or S110), ECU 300 skips the subsequent processing, and returns the processing to the main routine.

As described above, according to the second embodiment, even if the inside temperature increases, the prohibition of charge/discharge is not canceled during the same system activated period. Thus, a user operation is required for canceling the prohibition of charge/discharge. It is therefore possible to prevent discomfort to the user when vehicle 1 shifts from the Ready-OFF state to the Ready-ON state.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: vehicle; 2: power storage system; 10: first motor generator (first MG); 20: second motor generator (second MG); 30: power split device; 50: battery case; 52: lid; 60, 64: positive electrode terminal; 62, 66: negative electrode terminal; 70: electrode body; 72: positive electrode sheet; 74: negative electrode sheet; 76: separator; 100: engine; 101, 130: battery cell; 150: battery; 152: secondary battery; 155: voltage sensor; 156: current sensor; 157: surface temperature sensor; 158: environmental temperature sensor; 160: system main relay (SMR); 161: battery case; 162: lid; 163: positive electrode terminal; 164: negative electrode terminal; 165: electrode body; 166: positive electrode sheet; 167: negative electrode sheet; 168: separator; 169: excess electrolytic solution; 170: charge relay (CHR); 180: power converter; 190: charging connector; 200: power control unit (PCU); 210, 220: inverter; 230: converter; 300: electronic control unit (ECU); 302: CPU; 304: memory; 310: ignition switch; 350: drive wheel; 500: external power supply; 510: charging plug.

The invention claimed is:

1. A power storage system comprising:
a battery containing an electrolytic solution; and
a control device that controls, based on a temperature of said battery, permission and prohibition of charge/discharge of said battery,
said control device being configured to:
set a first determination temperature equal to or higher than a freezing point of said electrolytic solution and lower than a melting point of said electrolytic solution and a second determination temperature higher than said first determination temperature; and
prohibit charge/discharge of said battery when the temperature of said battery falls below said first determination temperature while said electrolytic solution is in a liquid state, and cancel the prohibition of charge/discharge of said battery when said electrolytic solution turns into the liquid state from a state in which said electrolytic solution is at least partially solidified, and when the temperature of said battery exceeds said second determination temperature.

2. The power storage system according to claim 1, wherein
said second determination temperature is set to be higher than the melting point of said electrolytic solution by a prescribed temperature.

3. The power storage system according to claim 1, further comprising:
an environmental temperature sensor configured to measure an environmental temperature of said battery, and
a surface temperature sensor configured to measure a surface temperature of said battery, wherein
said control device calculates an inside temperature of said battery from said environmental temperature and said surface temperature, and controls, based on said inside temperature, the permission and prohibition of charge/discharge of said battery.

4. The power storage system according to claim 1, wherein
said power storage system is mounted in an electric-powered vehicle,
said electric-powered vehicle includes an operation unit for starting and shutting down a running system of said electric-powered vehicle, and
said control device being configured to:
prohibit charge/discharge of said battery when the temperature of said battery falls below said first determination temperature during an activated period that is a period from starting to shutting down of said running system by operation of said operation unit; and
refrain from canceling the prohibition of charge/discharge of said battery even though the temperature of said battery exceeds said second determination temperature during said activated period, and cancel the prohibition of charge/discharge of said battery when the temperature of said battery exceeds said second determination temperature during an activated period after said activated period.

5. The power storage system according to claim 1, wherein
said first determination temperature being set based on a relation between the freezing point of said electrolytic solution and a degree of deterioration of said battery.

6. The power storage system according to claim 5, wherein said degree of deterioration is calculated using a rate of increase in internal resistance of said battery or a capacity retention rate of said battery.

7. A method for controlling a power storage system comprising the steps of:
setting a first determination temperature equal to or higher than a freezing point of an electrolytic solution of a battery and lower than a melting point of said electrolytic solution;
setting a second determination temperature higher than said first determination temperature;
prohibiting charge/discharge of said battery when a temperature of said battery falls below said first determination temperature while said electrolytic solution is in a liquid state; and
canceling the prohibition of charge/discharge of said battery when said electrolytic solution turns into a liquid from a state in which said electrolytic solution is at least partially solidified, and when the temperature of said battery exceeds said second determination temperature.

* * * * *